United States Patent
Asahi (10) Patent No.: US 7,193,735 B2
(45) Date of Patent: Mar. 20, 2007

(54) IMAGE FORMING APPARATUS, CONTROL METHOD THEREFOR, AND STORAGE MEDIUM

(75) Inventor: Takako Asahi, Chiba (JP)

(73) Assignee: Canon Kabushiki Kaisha, Tokyo (JP)

(*) Notice: Subject to any disclaimer, the term of this patent is extended or adjusted under 35 U.S.C. 154(b) by 880 days.

(21) Appl. No.: 09/761,703

(22) Filed: Jan. 18, 2001

(65) Prior Publication Data

US 2002/0018227 A1   Feb. 14, 2002

(30) Foreign Application Priority Data

Jan. 19, 2000   (JP)   .............................. 2000-010830

(51) Int. Cl.
*B41B 19/00*   (2006.01)
*B41B 27/28*   (2006.01)

(52) U.S. Cl. ..................... 358/1.13; 358/1.15; 358/1.12

(58) Field of Classification Search .................. 399/85, 399/82, 75, 86; 358/1.15, 1.13; 355/55
See application file for complete search history.

(56) References Cited

U.S. PATENT DOCUMENTS

| | | | | |
|---|---|---|---|---|
| 4,502,776 A | * | 3/1985 | Matsumoto et al. | 399/403 |
| 4,821,107 A | * | 4/1989 | Naito et al. | 358/440 |
| 4,851,878 A | * | 7/1989 | Sumida | 399/10 |
| 4,881,104 A | * | 11/1989 | Kusumoto et al. | 399/18 |
| 5,042,793 A | * | 8/1991 | Miyake | 271/293 |
| 5,435,544 A | * | 7/1995 | Mandel | 271/298 |
| 5,546,166 A | * | 8/1996 | Hirota et al. | 399/43 |
| 5,587,799 A | * | 12/1996 | Kawamura et al. | 358/296 |
| 5,852,764 A | * | 12/1998 | Kida et al. | 399/401 |
| 5,957,450 A | * | 9/1999 | Kida et al. | 271/291 |
| 5,971,394 A | * | 10/1999 | Kida et al. | 271/303 |
| 6,278,526 B1 | * | 8/2001 | Kurozasa | 358/1.15 |
| 6,281,980 B1 | * | 8/2001 | Maemura et al. | 358/1.14 |
| 6,388,759 B1 | * | 5/2002 | Yoshida et al. | 358/1.13 |
| 6,406,013 B1 | * | 6/2002 | Nanba et al. | 270/58.11 |
| 6,606,465 B2 | * | 8/2003 | Mutoh et al. | 399/81 |
| 6,618,061 B2 | * | 9/2003 | Yamamoto | 345/817 |

* cited by examiner

*Primary Examiner*—Twyler Lamb
*Assistant Examiner*—Myles D. Robinson
(74) *Attorney, Agent, or Firm*—Fitzpatrick, Cella, Harper & Scinto (57) ABSTRACT

This invention provides an environment in which, for example, even when the operation mode shifts to a specific one after a standby state for a predetermined time, a discharge tray corresponding to this operation mode functions to smoothly perform the next operation. For this purpose, if the standby state continues even upon the lapse of an auto-clear setting time, the operation mode shifts to a set specific one, and movement of a discharge tray corresponding to this operation mode is controlled.

5 Claims, 8 Drawing Sheets

OFFLINE SETTING

FIG. 6B

ONLINE SETTING

FIG. 7

IMAGE FORMING APPARATUS, CONTROL METHOD THEREFOR, AND STORAGE MEDIUM

FIELD OF THE INVENTION

The present invention relates to an image forming apparatus having a plurality of operation modes, a control method therefor, and a storage medium.

BACKGROUND OF THE INVENTION

In recent years, a copying machine, facsimile machine, and printer, which had conventionally been independent machines, have been integrated into an image forming apparatus such as a single digital composite machine, due to the spread of networks or the like. This reduces the required space and power consumption, and such image forming apparatuses are expected to become more popular in an office or the like.

Assuming the use in an office or the like, the above-described image forming apparatus having various modes is generally used as a copying machine most frequently (high copying mode use frequency). The image forming apparatus can be set to, e.g., "return to the initial window of the copying mode regardless of whether an immediately preceding operation is a facsimile, copying, or printer operation when it is left unused for 3 min or more."

If this image forming apparatus remains unused for 3 min or more after operating in, e.g., the FAX mode last, the display window of the operation panel is switched to the initial window of the copying mode.

At this time, when the image forming apparatus has a plurality of discharge units, and bins dedicated to the copying, facsimile, and printer modes are arranged, the bin position stays the same after the end of the FAX mode in a conventional composite machine. To use the copying function, the bin position must be returned to a copying operation position upon reception of a copying operation instruction.

In copying operation of a new job, a copying bin must be moved. This prolongs the time till actual copying and discharge upon reception of a copying instruction.

In this manner, in starting a given operation mode, a long time is taken to end the mode because of the necessity of a setup operation time for executing the mode. Demands have thus arisen for smoothly operating the above image forming apparatus and increasing the productivity.

SUMMARY OF THE INVENTION

It is an object of the present invention to provide an image forming apparatus which solves the above problem, a control method therefor, and a storage medium.

It is another object of the present invention to provide an image forming apparatus in which, even when the operation mode shifts to a specific one after a standby state for a predetermined time, a discharge tray corresponding to this operation mode can function to smoothly perform the next operation, thereby increasing the productivity, a control method therefor, and a storage medium.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENT

A preferred embodiment of the present invention will be described in detail below with reference to the accompanying drawings.

This embodiment will exemplify a digital composite machine as an image forming apparatus having a plurality of operation modes including at least three functions, i.e., a copying mode implementing a function of a copying machine, a facsimile mode implementing a function of a facsimile machine, and a printer mode implementing a function of a printer.

[Description of Arrangement of Control System]

Figure 1:
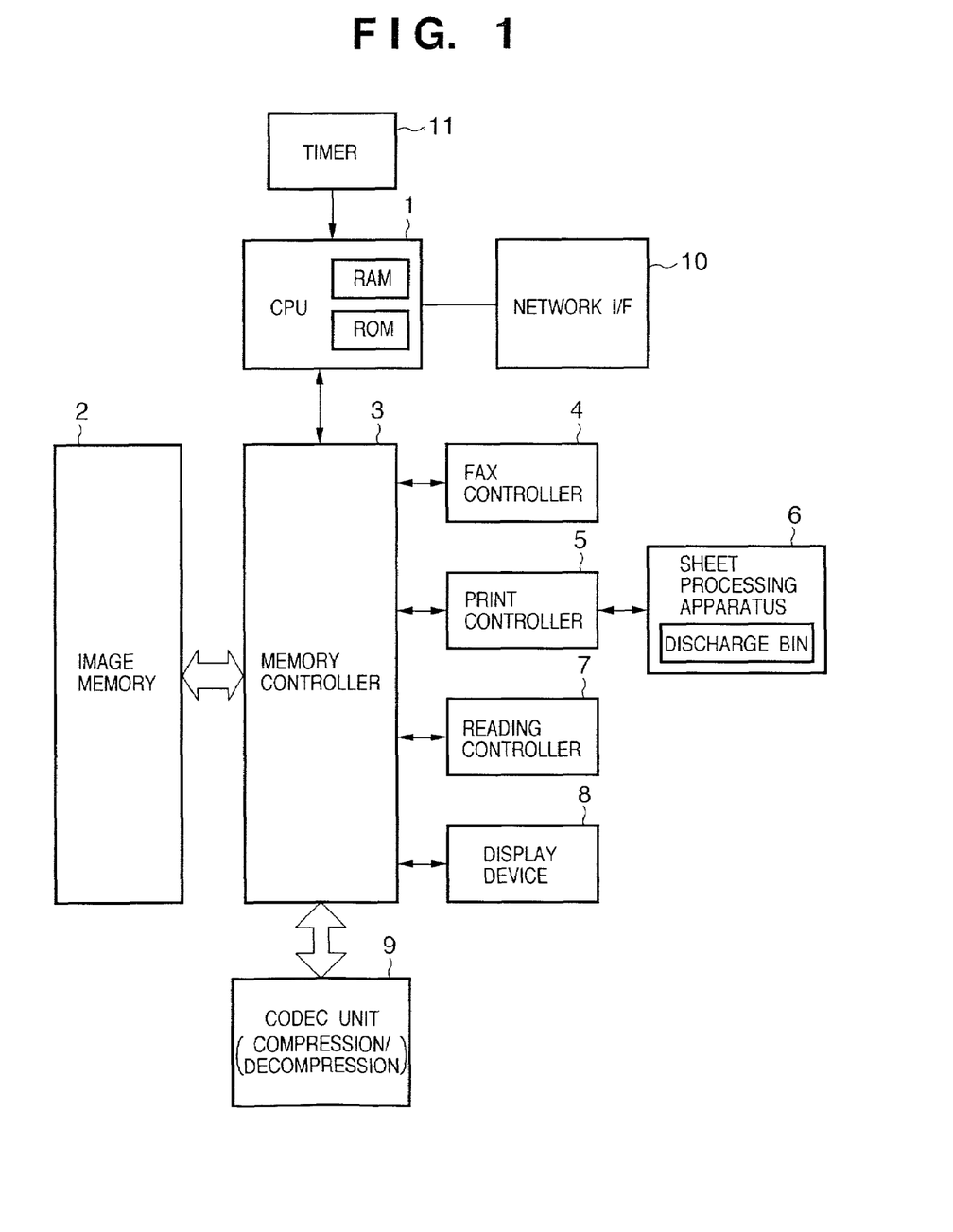
FIG. 1 is a block diagram showing the control system of a composite apparatus in an embodiment.

FIG. 1 is a block diagram showing a whole digital composite machine according to the embodiment.

In FIG. 1, reference numeral 1 denotes a CPU for controlling the overall apparatus; and 2, an image memory used to process image data in each mode (copying mode, facsimile mode, or printer mode). The image memory 2 has a memory for mapping, into a state for image formation on a print sheet, image data read by a scanner in the copying mode, image data received from a remote external device such as a computer via a network I/F 10 in the printer mode, or image data received via a FAX controller 4 in the facsimile mode. Part of the image memory also has a memory for mapping information to be displayed on a display device (to be described later; a liquid crystal display attached to an operation panel in this embodiment). Reference numeral 3 denotes a memory controller for controlling the flow and distribution of data between the image memory 2 and respective controllers (to be described below) under the control of the CPU 1.

The processors include the FAX controller 4 for performing facsimile communication, a print controller 5 for communicating with a printer engine, a reading controller 7 for controlling reading of a document sheet, a display device 8 for displaying image data mapped in a predetermined memory area in the image memory 2, and a codec unit 9 for decoding facsimile-received data or coding an image read by the reading controller 7 in facsimile transmission. The print controller 5 also controls a discharge device 6 having a plurality of bins.

A network interface (I/F) 10 is connected to each terminal on a network, and allows the composite machine to function as a printer of each terminal on the network. The embodiment adopts the network interface to function as a printer. This interface suffices to be any type of interface (e.g., an interface available from Centronic Corp., U.S.A., or RS232C). Reference numeral 11 denotes a timer for counting an auto-clear time (to be described later) in the embodiment.

[Arrangement of Mechanism]

Figure 2:
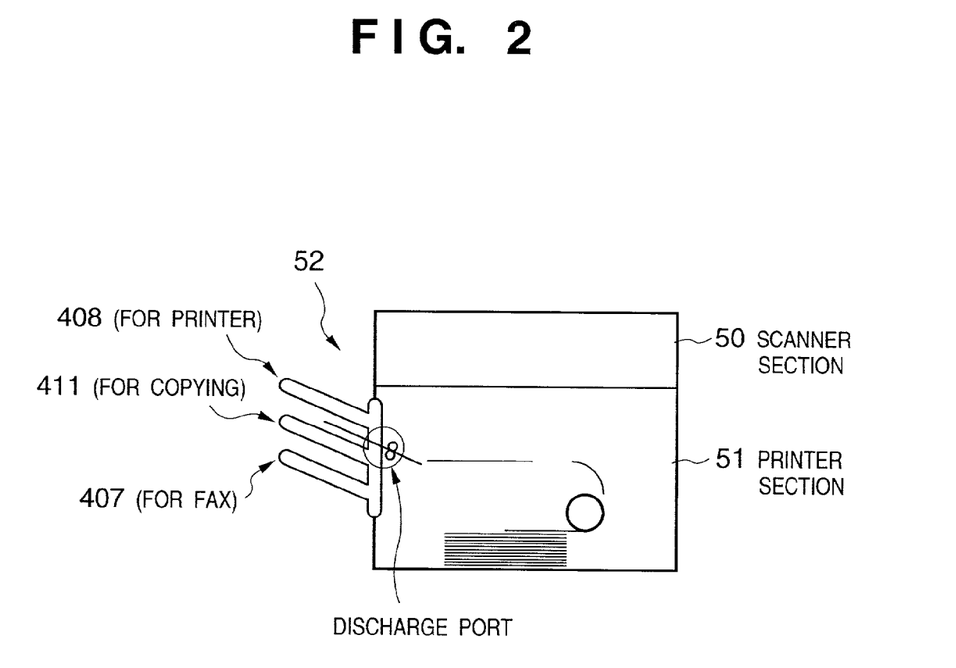
FIG. 2 is a schematic view showing the mechanism of the composite apparatus in the embodiment.

The composite machine in the embodiment has an arrangement shown in FIG. 2. More specifically, the composite machine comprises a scanner section 50 for reading a document image, a printer section 51 for printing various image data from a plurality of independent input paths, e.g., image data received by facsimile communication, image data read by the scanner, and image data received from a remote computer, and a freely mountable sheet processing apparatus 52 having a plurality of bins for storing sheets discharged via discharge port rollers 410 (FIG. 3) of the printer section 51. Note that the operation panel including the display device 8 is attached to the scanner section 50.

The sheet processing apparatus 52 has a plurality of bins. In the embodiment, the top bin is used as a facsimile mode bin (bin for storing print sheets from the printer section 51 on which image data received by facsimile communication are formed); the middle bin (as will be described later, the middle stage is actually made up of a plurality of bins), as a copying mode bin (bin for storing print sheets from the printer section 51 on which image data read by the scanner are formed); and the bottom bin, as a printer mode bin (bin for storing print sheets from the printer section 51 on which image data received by a remote computer are formed). Needless to say, the order is not limited to this. Setting and modification of bins and corresponding modes can be designated by an operator such as a manager via a user mode setting window displayed on the operation panel.

Figure 3:
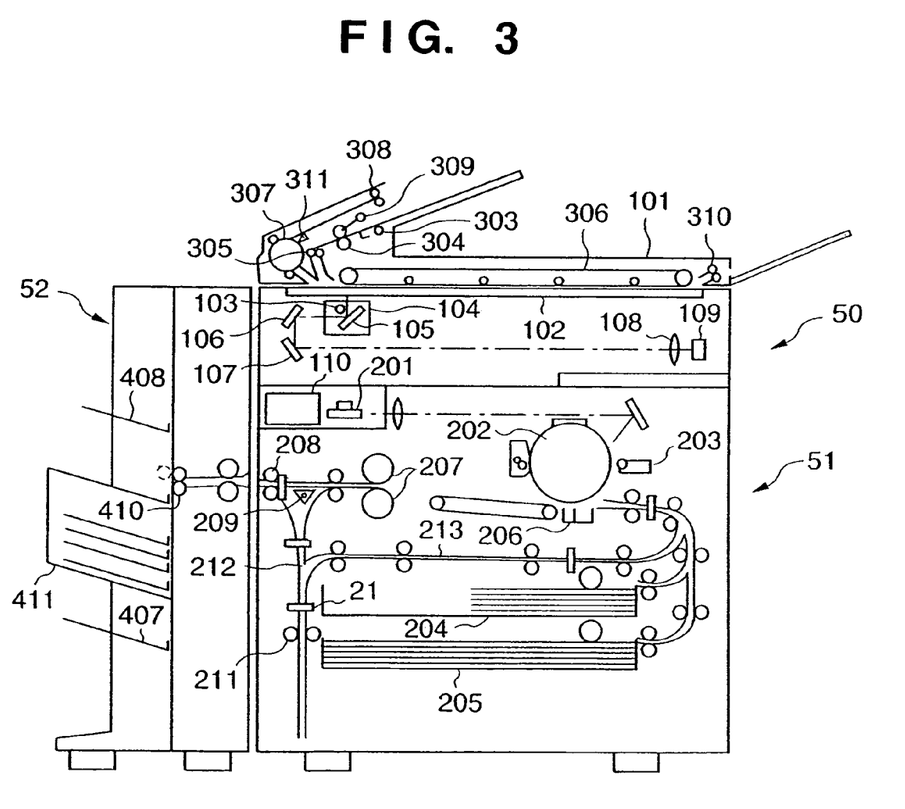
FIG. 3 is a sectional view showing the structure of the composite apparatus in the embodiment.

FIG. 3 is a view showing the structure of FIG. 2 in more detail. In FIG. 3, reference numeral 110 denotes a controller constituted by the circuit unit of the control system shown in FIG. 1. The structure shown in FIG. 3 will be explained together with the operation.

<Description of Operation of Document Feeder>

Document sheets stacked facing up on a document feeder 101 are sequentially conveyed one by one to a glass surface 102 of a document table. A stack tray has a width-direction regulation plate for regulating the direction of width of a document sheet in a document feed direction so as not to feed a document sheet askew. The stack tray slides perpendicularly in the document feed direction.

Lower separation operation for a document will be described. Document sheets are separated one by one from the bottom of a document by a woodruff roller 303 and separation roller 304. The separated document sheet is conveyed to and stopped at the exposure position of the platen glass 102 by convey rollers 305 and a full-face belt 306. Then, image reading starts. After the end of image read, the document sheet on the platen glass 102 is returned to the top of the document by a large convey roller 307 and convey rollers 308.

Upper separation operation for a document will be explained. Document sheets are separated one by one from the top of a document by a pickup roller 309 and the separation roller 304. The separated document sheet is conveyed to and stopped at the exposure position of the platen glass 102 by the convey rollers 305 and full-face belt 306. Then, image reading starts. After the end of image read, the document sheet on the platen glass 102 is discharged to an external discharge tray via external discharge rollers 310.

In a double-side document sheet, the document sheet is temporarily guided to the image reading position, as described above. After the end of image read, a pivotal selector flapper 311 is switched to guide the leading end of the document sheet to a bus, and the document sheet is conveyed to and stopped on the platen glass 102 by the convey rollers 305 and full-face belt 306. That is, the document sheet is reversed by rotation of the large convey roller 307.

<Description of Document Reading/Printing Operation>

When a start key is pressed on an operation section (operation panel; to be described later) attached to the front surface of the main body, and a document sheet is set on the document feeder 101, the above-mentioned document feed operation is performed, and document reading/printing operation waits until the document sheet is conveyed to a predetermined position on the glass surface 102. When a document sheet is directly set at the predetermined position on the glass surface 102, and the start key of the operation section is pressed, a lamp 103 of the scanner section is turned on, and a scanner unit 104 moves to irradiate the document sheet. Light reflected by the document sheet is incident on a CCD image sensor 109 (to be referred to as a CCD hereinafter) via mirrors 105, 106, and 107 and a lens 108.

Image processes set in various operation sections are executed under the control of the controller 110. In the copying operation, data having undergone image processing as described above is output to the printer section 51, and converted into an optical signal modulated by an exposure controller 201, thereby irradiating a photosensitive body 202. A latent image formed on the photosensitive body 202 by the irradiation light is developed by a developing unit 203. A transfer sheet is conveyed from a transfer sheet stack unit 204 or 205 in synchronism with the leading end of the latent image, and the developed image is transferred to the transfer sheet by a transfer unit 206. The transferred image is fixed to the transfer sheet by a fixing unit 207, and then the transfer sheet is discharged outside the apparatus via a discharge unit 208. An electrical signal output to the image memory 2 is stored in a compressed-image memory in the image memory 2 by an image compression controller (not shown). The image stored once in the image memory 2 is sent to a selector again by an image decompression controller (not shown), and output to a printer section 51.

<Description of Operation of Discharge Device>

A printed sheet (print medium or printed paper sheet) output from the discharge unit 208 is input to the sheet processing apparatus 52. As described with reference to FIG. 2, the sheet processing apparatus 52 has many movable bins. The top stage has a bin 408 used in the facsimile mode; the middle stage, a bin 411 (in practice, a plurality of bins are arranged for a plurality of sets of copies) used in the copying mode; and the bottom stage, a bin 407 corresponding to the printer mode used when the apparatus functions as a printer. The CPU 1 controls movement of bins so as to move a certain bin to the position of the discharge port rollers 410 by a motor (not shown) depending on the operation mode of the apparatus.

For example, in double-side copying, the convey direction of an output sheet whose image is fixed by the fixing unit 207 is switched by reversing the sheet convey direction of rollers 211 by a flapper 209 at a timing from a sensor 21 via a reverse path 212. Then, the sheet is conveyed to an image-bearing sheet refeed stack unit 213. If the next document sheet is set, the document image is read by the same process. A transfer sheet is fed from the image-bearing sheet refeed stack unit 213, thereby outputting two document images on the upper and lower surfaces of a single output sheet.

Even when an external host computer issues a double-side instruction, the same print medium convey sequence is employed.

When a print medium is to be discharged with the printed surface (surface printed first for double-side printing) facing down, the sheet convey direction of an output sheet whose image is fixed by the fixing unit 207 is reversed by swinging the convey direction switching member 209 once. Then, the output sheet is conveyed to the reverse rollers 211. After the sheet passes through the convey direction switching member 209, the reverse rollers 211 are rotated counterclockwise to convey the sheet to the discharge unit 208. Document sheets which are set to face up and fed from the document feeder by upper separation operation are discharged by reverse discharge after image formation so as not to disturb their order.

[Description of Operation Panel]

The operation panel is arranged in the scanner section 50, and constituted by a liquid crystal display and a touch panel attached to the front surface of the display screen in the embodiment. This operation panel obviates the need for arranging a physical switch, and contributes to reduction in apparatus cost.

The composite machine of the embodiment has three functions of a copying machine, facsimile machine, and printer. The images of display windows corresponding to the respective modes are mapped by the CPU 1 in a predetermined area of the image memory 2, and displayed on the display device 8 (liquid crystal display). The touch panel attached to the display screen constitutes a user interface.

Figure 4:
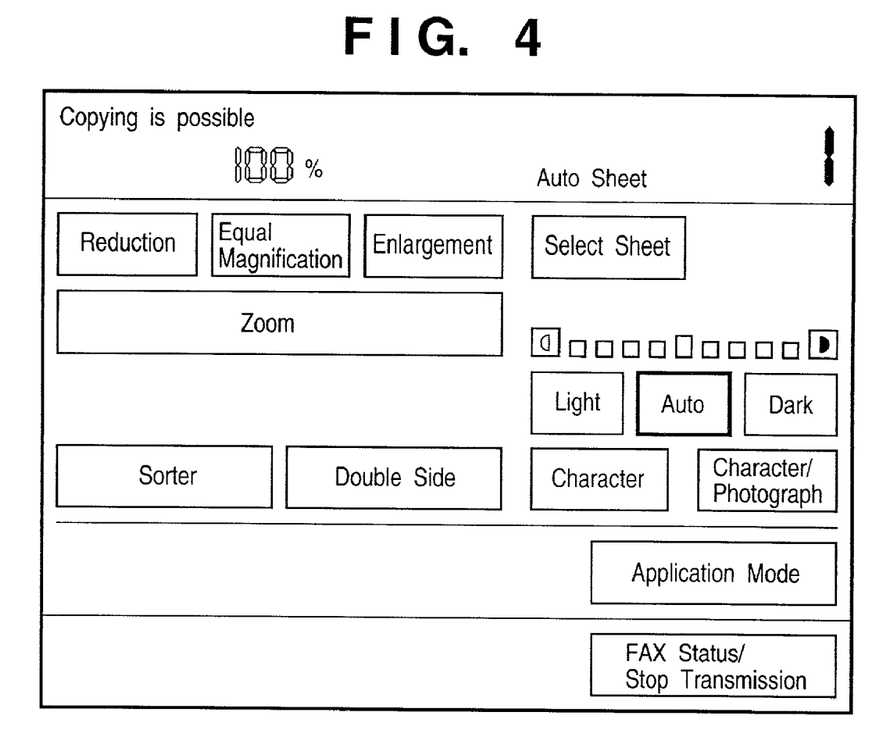
FIG. 4 is a view showing an example of the initial window of a copying mode in the embodiment.
Figure 5:
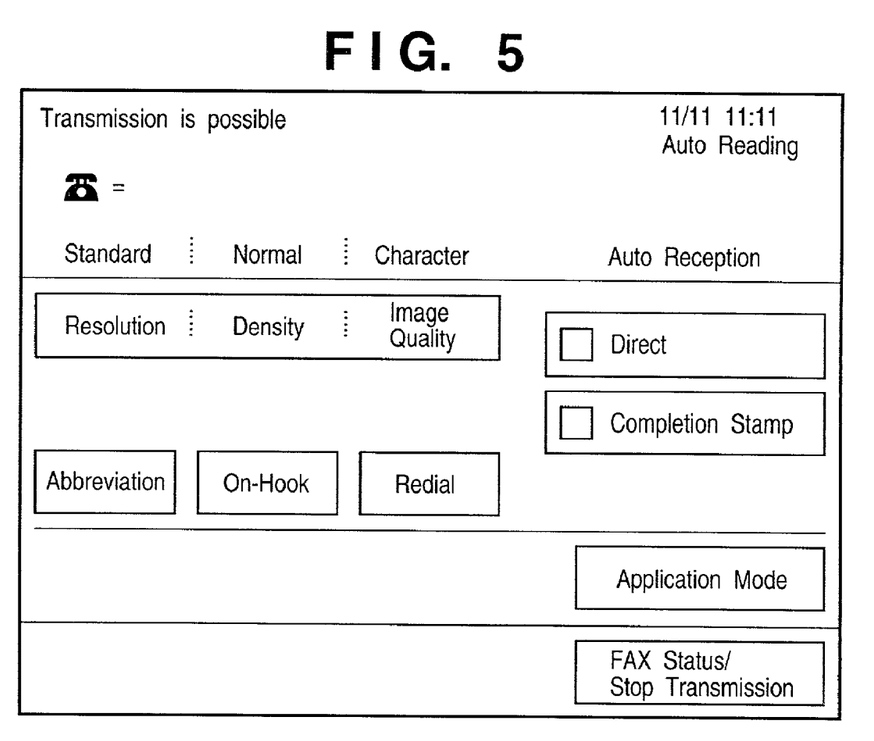
FIG. 5 is a view showing an example of the initial window of a FAX mode in the embodiment.
Figure 6A:
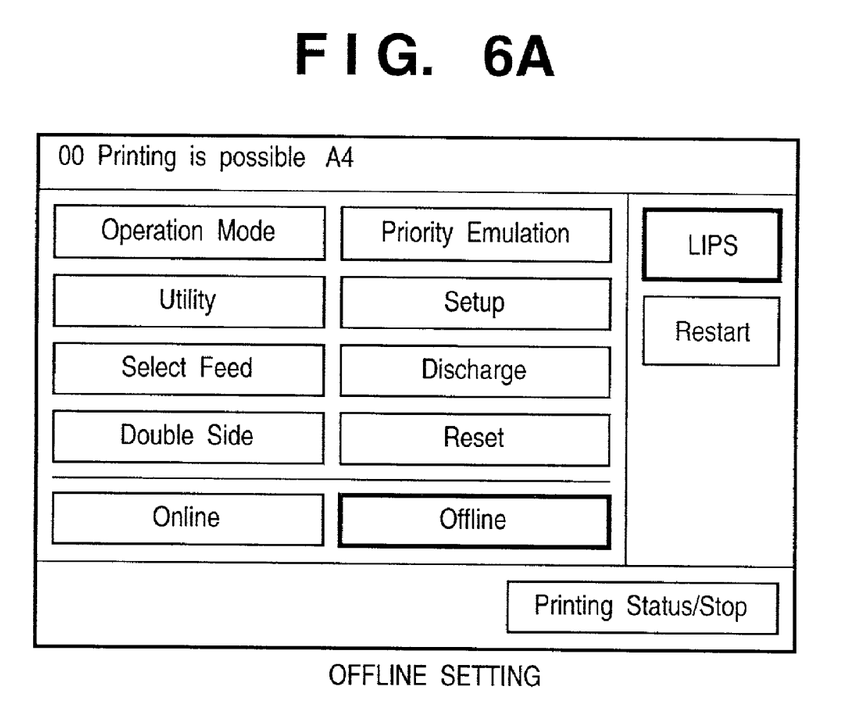
FIGS. 6A and 6B are views showing examples of the initial window of a printer mode in the embodiment.
Figure 6B:
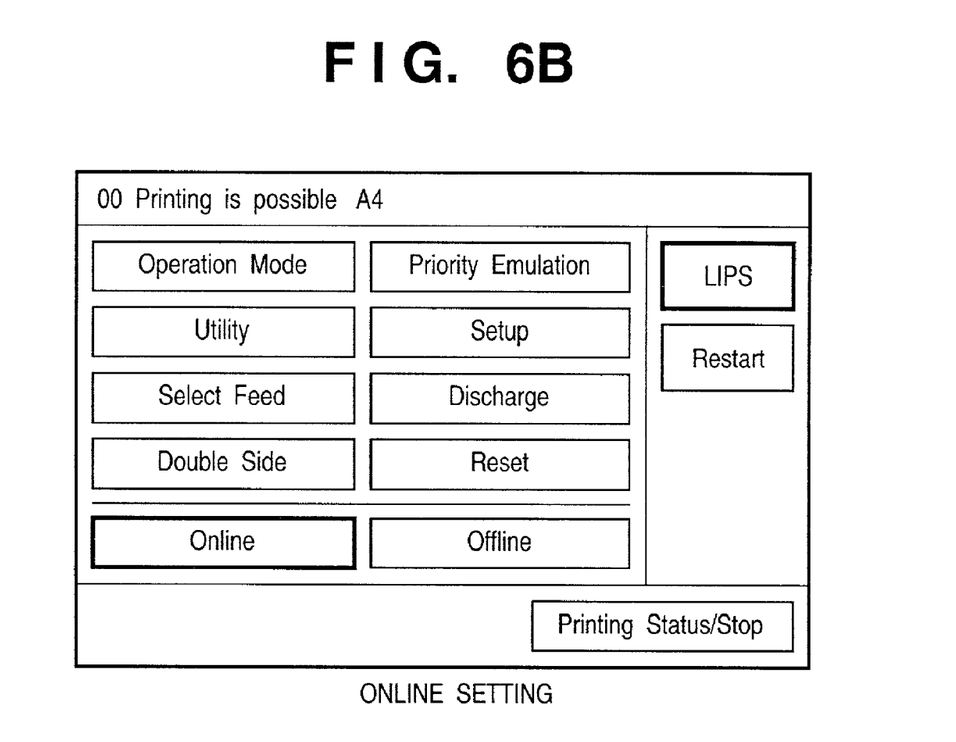

FIGS. 4 to 6 show initial windows in the respective modes.

FIG. 4 shows an initial window in the copying mode. As shown in FIG. 4, the display window has software buttons (to be simply referred to as buttons hereinafter) for setting the magnification, various buttons for setting the density and the like, and buttons (for a character line image like a normal document, and for a document including a photograph) for setting image processing in copying operation. By touching a sorter button or double-side button, a detailed setting window is displayed. This is irrelevant to the embodiment, and a description thereof will be omitted.

A copying start instruction is issued by manipulating another physical button. This button is a common button for instructing the start of processing in the respective modes.

FIG. 5 shows an initial window in the facsimile mode (transmission mode). In facsimile reception, data is automatically received upon reception of an incoming call. At this time, if the composite machine has not been operating in another mode, the data is decoded and printed. If, however, the composite machine has been operating in another mode, the data is temporarily stored in the image memory 2. After the current operation processing mode ends, the received coded data is decoded and printed.

That is, FAX reception is done regardless of the window, and the facsimile function is selected as a function after auto-clear operation. Even if the window is the initial window of the FAX mode, printing by FAX reception is executed.

In addition to printing of a received document, printing in the facsimile mode includes
- printing of a report (list of past transmission/reception histories)
- printing of a transmission image (coping with a user who wants to set whether to print out a transmission image in order to confirm its contents)

In the facsimile mode, there are provided various buttons as shown in FIG. 5 in addition to buttons for selecting the document reading resolution, density, and image quality (character line image or halftone image). By touching an abbreviation button, a list of abbreviation dial keys are displayed in another window, and the user selects, e.g., a partner destination from the list.

FIGS. 6A and 6B show windows when the apparatus operates in the printer mode. FIG. 6A shows a window when an offline button is touched, and FIG. 6B shows a window (initial window) when an online button is touched.

In the online state, characters are displayed in light color, as shown in FIG. 6B, in order to represent that it is impossible to set an operation mode or the like.

Several buttons function in the offline state, as shown in FIG. 6A. For example, a priority emulation button is for setting priority in automatically interpreting a plurality of printer languages and selecting an optimal emulation. A utility button is for performing setting of, e.g., printing images of a plurality of pages on one print sheet.

In this way, a plurality of operation modes in the embodiment have corresponding initial windows.

According to the embodiment, when a physical switch (not shown) attached to the operation panel is manipulated, a setting window for an operation mode in auto-clear operation in the composite machine is displayed. Items set on the auto-clear operation window are the time and operation mode. The "time" to be set means the duration of a standby state after a certain job is done, and the "operation mode" to be set means a mode which is automatically set after the lapse time.

For example, the lapse time is set to 3 min, and the "copying mode" is set as an operation mode in auto-clear operation. In this case, when no operation is done for 3 min upon the completion of a given job (e.g., a job in the facsimile mode or a job in the printer mode), the operation mode automatically shifts to the copying mode (if the finally processed job is in the copying mode, the operation mode does not change), and the CPU 1 executes display control for display contents on the operation panel on the basis of time data or the like from the timer 11 so as to display an initial window (window shown in FIG. 4) for the copying mode. For example, when no operation is done for 3 min upon the completion of a given job (job in the copying mode or job in the printer mode) in accordance with setting of the "facsimile mode" on the window, the operation mode automatically shifts to the facsimile mode (if the finally processed job is in the facsimile mode, the operation mode does not change), and the CPU 1 executes display control for display contents on the operation panel so as to display an initial window (window shown in FIG. 5) for the facsimile mode. For example, when no operation is done for 3 min upon the completion of a given job (job in the copying mode or job in the facsimile mode) in accordance with setting of the "printer mode" on the window, the operation mode automatically shifts to the printer mode (if the finally processed job is in the printer mode, the operation mode does not change), and the CPU 1 executes display control for display contents on the operation panel so as to display an initial window (window shown in FIG. 6A or 6B) for the printer mode. Note that if the lapse time is set to 0, the composite machine operates without any auto-clear setting.

Note that the internal memory of the apparatus holds, as management information, information about an instruction from an operator such as a manager that is input via the operation mode setting window in auto-clear operation (including information about the auto-clear ON/OFF setting status, information representing which of the copying mode, facsimile mode, and printer mode is set as an operation mode automatically set by activation of auto-clear operation, and time information (3 min in the above example) about the lapse time serving as an auto-clear activation condition).

As described above, setting and modification of assignment of a plurality of bins to corresponding ones of operation modes including the copying mode, facsimile mode, and printer mode can be designated for each bin on the operation panel. The internal memory of the apparatus also holds, as management information, operation mode assignment setting information for each bin together with the auto-clear setting information.

Figure 7:
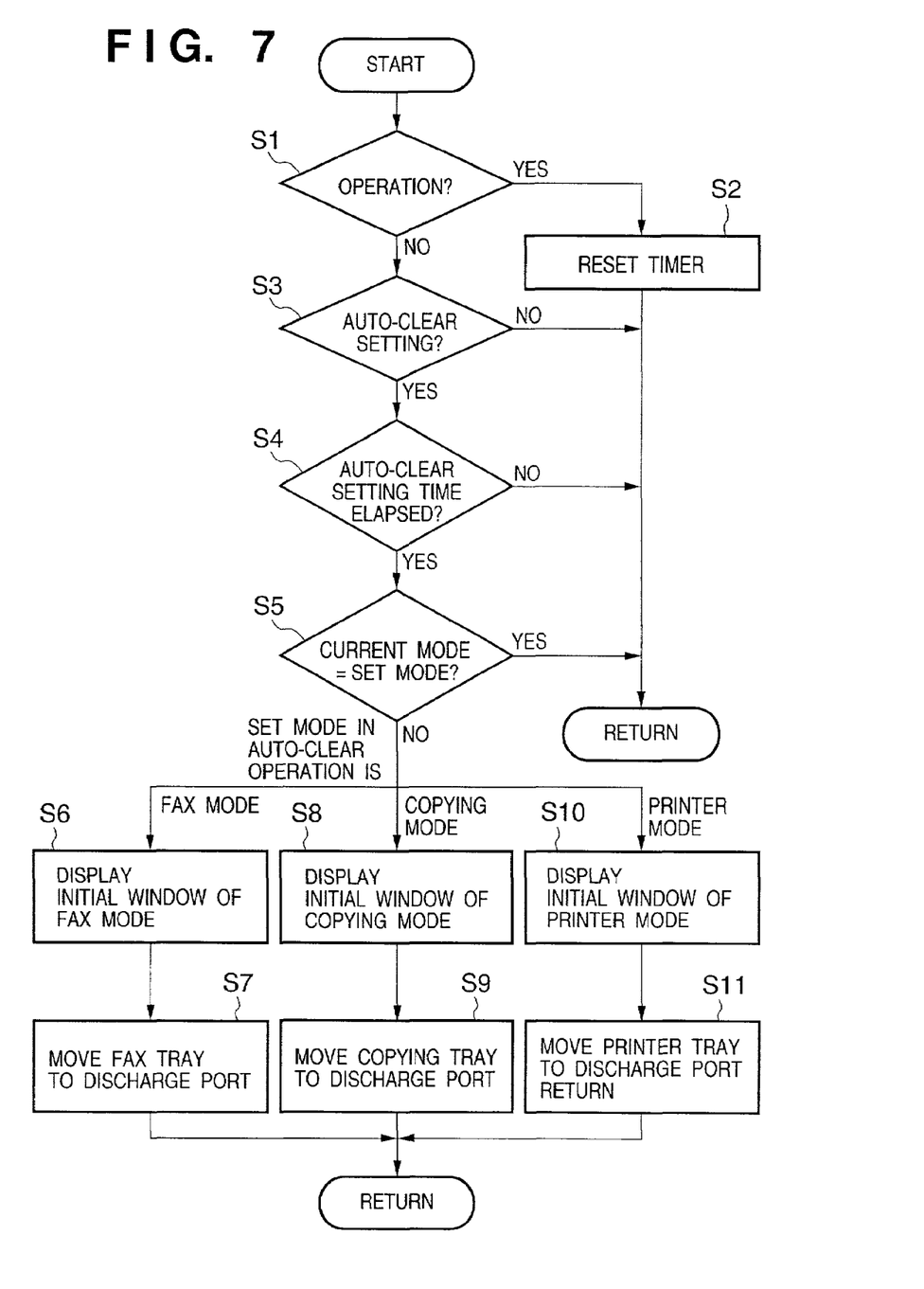
FIG. 7 is a flow chart showing operation panel monitoring processing in the embodiment.

An operation in this status will be explained with reference to the flow chart of FIG. 7. Processing shown in FIG. 7 is executed by the CPU 1, and a program concerning the flow chart of FIG. 7 is stored in a ROM in the CPU 1 (see FIG. 1). This program starts by an interrupt signal periodically generated by the timer 11. Main processing is processing of operating the image forming apparatus as a composite machine. This processing does not directly relate to the present invention, and a description thereof will be omitted. After the time is reset, it holds the lapse time after the reset.

In step S1, whether the operator manipulates various buttons (including logical and physical buttons) on the operation panel is determined. If YES in step S1, the processing advances to step S2 to reset the timer 11, and returns to main processing. In main processing, processing corresponding to the manipulated button is performed.

Note that determination in step S1 may be replaced by determination of whether an image formation job is generated by a data generation source such as an external device. If a job is determined to be generated, the processing advances to step S2; and if a job is determined not to be generated, the processing advances to step S3. The present invention can also be applied to this control.

If NO in step S2, the processing advances to step S3, and whether auto-clear setting is done is determined by checking the above-mentioned auto-clear setting information held as management information in the memory. If NO in step S3, the processing returns to main processing. If YES in step S3, the processing advances to step S4 to check set time information held as management information in the memory that serves as an auto-clear activation condition (3 min in the above example). Whether the set time has elapsed is determined from the time held by the timer 11 (in the above example, whether 3 min has elapsed without any operation after the end of operator's manipulation). If NO in step S4, the processing returns to main processing.

If YES in step S4, the processing advances to step S5, and whether the current operation mode (operation mode of the finally processed job) is the same as a mode to be set in auto-clear operation is determined by, e.g., checking the auto-clear setting information held as management information in the memory. If the current operation mode (i.e., the operation mode of the finally processed job) is the same as an operation mode automatically set by activation of auto-clear operation, no shift processing needs to be performed, and thus the processing ends (for example, a default operation mode automatically set by activation of auto-clear operation is set to the copying mode, and when the operation mode of the finally processed job is the copying mode, the processing ends because the operation modes coincide with each other).

If auto-clear setting is done (YES in step S3), no operation is performed after the lapse of the set time (YES in step S4), and the current mode is different from a mode set in auto-clear operation (NO in step S5), the processing branches to any one of steps S6, S8, and S10.

If the FAX mode is set as a mode automatically set in auto-clear operation (operation mode automatically set by activation of auto-clear operation is determined by checking auto-clear setting information held as management information in the memory), the processing advances from step S5 to step S6. In step S6, display image data corresponding to the initial window of the FAX mode is read out from the display memory of the image memory 2 in order to display the initial window of the facsimile mode (corresponding to, e.g., the window in FIG. 5) on the operation panel. Then, the initial window of the facsimile mode is displayed on the operation panel. (Note that display processing in step S6 includes various situations in which, when a display window (e.g., the initial window of the copying mode or printer mode other than that of the facsimile mode) other than a display window corresponding to an operation mode set in auto-clear operation is displayed, display contents on the display device are switched to the display window corresponding to the operation mode set in auto-clear operation (e.g., the initial window of the facsimile mode), and when no window is displayed on the operation panel, the display window corresponding to the operation mode set in auto-clear operation is displayed. This also applies to the following steps S8 and S10.) At the same time, instruction information for shifting to the FAX mode is set in main processing. In step S7, an instruction signal is sent to the print controller 5 so as to move the bin 408 of the sheet processing apparatus 52 to the position of the discharge rollers 410. The tray is moved to set the bin 408 to the position of the sheet discharge port of the apparatus main body. Then, the processing returns to main processing. Upon the completion of steps S6 and S7, the processing waits for the next new job. Accordingly, the current mode shifts to the facsimile mode in auto-clear operation. This is convenient for a user who mainly uses FAX.

If the copying mode is set as a mode automatically set by activation of auto-clear operation, the processing advances from step S5 to step S8. In step S8, display image data corresponding to the initial window of the copying mode is read out from the display memory of the image memory 2 in order to display the initial window of the copying mode (corresponding to, e.g., the window in FIG. 4). Then, the initial window of the copying mode is displayed on the operation panel. In addition, instruction information for shifting to the copying mode is set in main processing. In step S9, an instruction signal is sent to the print controller 5 so as to move the bin 411 (top tray in the bin 411; see FIG. 3) of the sheet processing apparatus 52 to the position of the discharge rollers 410. The tray is moved to set the top bin in the bin 408 to the position of the sheet discharge port of the apparatus main body. Then, the processing returns to main processing. Upon the completion of steps S8 and S9, the processing waits for the next new job. As a result, the current mode shifts to the copying mode in auto-clear operation. This is convenient for a user who mainly uses copying.

If the printer mode is set as a mode automatically set by activation of auto-clear operation, the processing advances from step S5 to step S10. In step S10, display image data corresponding to the initial window of the printer mode is read out from the display memory of the image memory 2 in order to display the initial window of the printer mode (corresponding to, e.g., the window in FIG. 6A). Then, the initial window of the printer mode is displayed on the operation panel. In addition, instruction information for shifting to the printer mode is set in main processing. In step S11, an instruction signal is supplied to the print controller 5 so as to move the bin 407 of the sheet processing apparatus 52 to the position of the discharge rollers 410. The tray is moved to set the bin 407 to the position of the sheet discharge port of the apparatus main body. Then, the processing returns to main processing. Upon the completion of steps S10 and S11, the processing waits for the next new job. The current mode shifts to the printer mode in auto-clear operation, and the online state can be set. That is, the online state can be attained when the operation mode automatically shifts to the printer mode. Setting of this mode is particularly suitable for an environment in which many terminals are installed on a network.

This embodiment has exemplified the sheet processing apparatus (movable bin type sheet processing apparatus) having a plurality of vertically movable bins. The present invention can also be applied to a fixed-bin type sheet processing apparatus which does not move bins.

When this device is applied, only processes in steps S7, S9, and S11 are replaced by processes of controlling a unit such as a flapper in the sheet processing apparatus that selectively switches the sheet covey path. More specifically, the sheet processing apparatus is controlled to switch the flapper so as to select a sheet convey path extending to a discharge bin corresponding to an operation mode after shift. In this fashion, the embodiment can also be applied to a fixed-bin type sheet processing apparatus.

As described above, according to the embodiment, when a standby state continues for a set time or more, the operation mode automatically shifts to a specific operation mode, and a discharge tray corresponding to the operation mode functions. By setting a mode which is set most frequently, an efficient work environment can be provided.

Note that processing in FIG. 7 is executed by a timer interrupt in the embodiment, but may be realized by adding processing of confirming the contents of the timer in main processing. The above embodiment does not limit the present invention.

The embodiment has exemplified an apparatus in which mechanisms and circuits related to an image reader, printer, and facsimile transmission/reception are integrated into one housing as hardware to attain three functions of a copying machine, facsimile machine, and printer. Alternatively, the present invention may be applied to a system in which an image scanner, printer, and facsimile modem are connected to a general-purpose information processing apparatus such as a personal computer.

In this case, the functions described in the above embodiment can be implemented by a program running on the information processing apparatus. The present invention is achieved even by supplying a storage medium (or recording medium) which records software program codes to a system or apparatus, and causing the computer (or a CPU or MPU) of the system or apparatus to read out and execute the program codes stored in the storage medium. In this case, the program codes read out from the storage medium realize the functions of the above-described embodiment, and the storage medium which stores the program codes constitutes the present invention. The functions of the above-described embodiment are realized not only when the computer executes the readout program codes, but also when the operating system (OS) running on the computer performs part or all of actual processing on the basis of the instructions of the program codes.

The functions of the above-described embodiment are also realized when the program codes read out from the storage medium are written in the memory of a function expansion card inserted into the computer or that of a function expansion unit connected to the computer, and the CPU of the function expansion card or function expansion unit performs part or all of actual processing on the basis of the instructions of the program codes.

As has been described above, according to the present invention, even when the operation mode shifts to a specific one after a standby state for a predetermined time, a discharge tray corresponding to this operation mode can function to smoothly perform the next operation, thereby increasing the productivity.

As many apparently widely different embodiments of the present invention can be made without departing from the spirit and scope thereof, it is to be understood that the invention is not limited to the specific embodiments thereof except as defined in the appended claims.

What is claimed is:

1. An image forming apparatus which can be connected to a sheet processing apparatus having a plurality of sheet storage trays of which positions are changeable, and has a plurality of operation modes including at least two modes from among a copy mode, an image communication mode, and a printer mode, said apparatus, comprising:
   first setting means for setting a relationship between each of operation modes and each of sheet storage trays, where, when the image forming apparatus works in an operation mode, a sheet storage tray assigned to the working operation mode is moved to an output position of the sheet processing apparatus;
   second setting means for manually setting one operation mode from among the operation modes as an auto-clear mode and storing information specifying the operation mode set as the auto-clear mode;
   determination means for determining whether a no-operation state by an operator continues for a predetermined time after the processing of an operation mode has been completed;
   auto-clear operation means for automatically setting the image forming apparatus to the operation mode set as the auto-clear mode on the basis of a determination result of said determination means; and
   control means for, in response to said auto-clear operation means, controlling the sheet processing apparatus so as to change the position of a sheet storage tray, which is assigned to the operation mode as the auto-clear mode, to the output position of the sheet processing apparatus, so that the sheet storage tray can store a sheet even if not receiving a job data for the operation mode set as the auto-clear mode.

2. The apparatus according to claim 1, further comprising a user interface including a display device commonly used in the respective modes,
   wherein in response to said auto-clear operation means setting the image forming apparatus to the predetermined operation mode, display control is performed to display a window corresponding to the predetermined operation mode.

3. The apparatus according to claim 1, further comprising setting means for selecting a mode to be set to by said auto-clear operation means.

4. A control method for an image forming apparatus which can be connected to a sheet processing apparatus having a plurality of sheet storage trays of which positions are changeable, and has a plurality of operation modes including at least two modes from among a copy mode, an image communication mode, and a printer mode, said method comprising:
- a step of setting a relationship between each of operation modes and each of sheet storage trays, where, when the image forming apparatus works in an operation mode, a sheet storage tray assigned to the working operation mode is moved to an output position of the sheet processing apparatus;
- a step of manually setting one operation mode from among the operation modes as an auto-clear mode and storing information specifying the operation mode set as the auto-clear mode;
- a step of determining whether a no-operation state by an operator continues for a predetermined time after the processing of an operation mode has been completed;
- a step of automatically setting the image forming apparatus to the operation mode set as the auto-clear mode on the basis of a determination result in the determination step; and
- a step of, in response to the operation mode, controlling the sheet processing apparatus so as to change the position of the sheet storage tray, which is assigned to the operation mode as the auto-clear mode, to the output position of the sheet processing apparatus, so that the sheet storage tray can store a sheet even if not receiving a job data for the operation mode set as the auto-clear mode.

5. A computer-readable storage medium which stores a program for causing an image forming apparatus which can be connected to a sheet processing apparatus having a plurality of sheet storage trays of which positions are changeable and has a plurality of operation modes including at least two modes from among a copy mode, an image communication mode, and a printer mode, to execute the following steps, comprising:
- a step of setting a relationship between each of operation modes and each of sheet storage trays, where, when the image forming apparatus works in an operation mode, a sheet storage tray assigned to the working operation mode is moved to an output position of the sheet processing apparatus;
- a step of manually setting one operation mode from among the operation modes as an auto-clear mode and storing information specifying the operation mode set as the auto-clear mode;
- a step of determining whether a no-operation state by an operator continues for a predetermined time after the processing of an operation mode has been completed;
- a step of automatically setting the image forming apparatus to the operation mode set as the auto-clear mode on the basis of a determination result in the determination step; and
- a step of, in response to the operation mode, controlling the sheet processing apparatus so as to change the position of the sheet storage tray, which is assigned to the operation mode as the auto-clear mode, to the output position of the sheet processing apparatus, so that the sheet storage tray can store a sheet even if not receiving job data for the operation mode set as the auto-clear mode.

* * * * *

UNITED STATES PATENT AND TRADEMARK OFFICE
CERTIFICATE OF CORRECTION

PATENT NO. : 7,193,735 B2 Page 1 of 1
APPLICATION NO. : 09/761703
DATED : March 20, 2007
INVENTOR(S) : Takako Asahi

It is certified that error appears in the above-identified patent and that said Letters Patent is hereby corrected as shown below:

COLUMN 4:
Line 25, "is" should read --are--.

COLUMN 5:
Line 62, "includes" should read --includes:--.

Signed and Sealed this

Twenty-seventh Day of November, 2007

JON W. DUDAS
*Director of the United States Patent and Trademark Office*